United States Patent
Segal

(10) Patent No.: US 10,531,044 B2
(45) Date of Patent: *Jan. 7, 2020

(54) INTELLIGENT VIRTUAL ASSISTANT SYSTEM AND METHOD

(71) Applicant: Touchcast LLC, New York, NY (US)

(72) Inventor: Edo Segal, New York, NY (US)

(73) Assignee: TOUCHCAST LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,701

(22) Filed: Jun. 7, 2018

(65) Prior Publication Data

US 2018/0352195 A1    Dec. 6, 2018

Related U.S. Application Data

(63) Continuation of application No. 15/867,639, filed on Jan. 10, 2018, now Pat. No. 10,075,676, which is a (Continued)

(51) Int. Cl.
*H04N 7/15* (2006.01)
*G06F 3/16* (2006.01)
(Continued)

(52) U.S. Cl.
CPC .............. *H04N 7/15* (2013.01); *G06F 3/0482* (2013.01); *G06F 3/167* (2013.01); *G11B 27/031* (2013.01);
(Continued)

(58) Field of Classification Search
CPC .... G06F 3/0482; G06F 3/04883; G06F 3/167; G11B 27/031; H04N 7/15; H04N 5/2222; H04N 21/4316; H04N 21/4722; H04N 21/4782; H04N 5/44513; H04N 2005/44521; H04N 21/42203;
(Continued)

(56) References Cited

U.S. PATENT DOCUMENTS 6,020,931 A    2/2000 Bilbrey et al.
7,577,978 B1   8/2009 Wistendahl et al.
(Continued)

FOREIGN PATENT DOCUMENTS

GB        2 502 986      12/2013
WO   WO 2010/141939     12/2010
(Continued)

*Primary Examiner* — Huy T Nguyen
(74) *Attorney, Agent, or Firm* — Leason Ellis LLP

(57) ABSTRACT

An intelligent virtual assistant is provided for respectively customizable interactive audio/video content to each of a plurality of computing devices during a networked communication session. Input is received from at least one device, and is determined via information provided in or with the input, that the input is at least one of speech input, facial input, gesture input and textual input. The input is processed and machine-based learning occurs using at least some of the processed input. The intelligent virtual assistant is provided for the respectively customizable interactive audio/video content as a function of the machine-based learning process via at least one of the plurality of computing devices.

20 Claims, 16 Drawing Sheets

Related U.S. Application Data continuation-in-part of application No. 15/683,403, filed on Aug. 22, 2017, now Pat. No. 10,033,967, which is a continuation of application No. 15/247,534, filed on Aug. 25, 2016, now Pat. No. 9,787,945, which is a continuation-in-part of application No. 14/833,984, filed on Aug. 24, 2015, now Pat. No. 9,661,256, which is a continuation-in-part of application No. 14/316,536, filed on Jun. 26, 2014, now Pat. No. 9,363,448.

(60) Provisional application No. 62/444,525, filed on Jan. 10, 2017, provisional application No. 62/545,994, filed on Aug. 15, 2017, provisional application No. 62/565,094, filed on Sep. 28, 2017, provisional application No. 62/242,029, filed on Oct. 15, 2015, provisional application No. 62/329,081, filed on Apr. 28, 2016, provisional application No. 62/209,727, filed on Aug. 25, 2015, provisional application No. 61/839,757, filed on Jun. 26, 2013, provisional application No. 61/845,743, filed on Jul. 12, 2013.

(51) Int. Cl.
| | |
|---|---|
| *H04N 21/4788* | (2011.01) |
| *H04N 21/431* | (2011.01) |
| *H04N 21/4722* | (2011.01) |
| *H04N 21/6587* | (2011.01) |
| *H04N 5/445* | (2011.01) |
| *H04N 5/222* | (2006.01) |
| *G11B 27/031* | (2006.01) |
| *G06F 3/0482* | (2013.01) |
| *H04N 21/4782* | (2011.01) |
| *H04N 5/262* | (2006.01) |
| *H04N 21/25* | (2011.01) |
| *H04N 21/2668* | (2011.01) |
| *H04N 21/422* | (2011.01) |
| *H04N 21/4223* | (2011.01) |
| *G06F 3/0488* | (2013.01) |
| *G11B 27/036* | (2006.01) |

(52) U.S. Cl.
CPC ......... *G11B 27/036* (2013.01); *H04N 5/2222* (2013.01); *H04N 5/262* (2013.01); *H04N 5/44513* (2013.01); *H04N 7/155* (2013.01); *H04N 21/251* (2013.01); *H04N 21/2668* (2013.01); *H04N 21/4223* (2013.01); *H04N 21/42203* (2013.01); *H04N 21/4316* (2013.01); *H04N 21/4722* (2013.01); *H04N 21/4782* (2013.01); *H04N 21/4788* (2013.01); *H04N 21/6587* (2013.01); *G06F 3/04883* (2013.01); *G06F 2203/0381* (2013.01); *H04N 2005/44521* (2013.01); *H04N 2005/44573* (2013.01)

(58) Field of Classification Search
CPC ........... H04N 21/4223; H04N 21/6587; H04N 2005/44573
See application file for complete search history.

(56) References Cited

U.S. PATENT DOCUMENTS

| | | | |
|---|---|---|---|
| 8,508,614 B2 | 8/2013 | Segal | |
| 8,584,164 B2 | 11/2013 | Walter et al. | |
| 8,745,657 B2 | 6/2014 | Chalozin et al. | |
| 9,036,043 B2 * | 5/2015 | Segal | H04N 5/265 |
| | | | 348/222.1 |
| 9,363,448 B2 * | 6/2016 | Segal | H04N 5/265 |
| 9,661,256 B2 * | 5/2017 | Segal | H04N 21/25891 |
| 9,787,945 B2 * | 10/2017 | Segal | H04N 7/15 |
| 10,033,967 B2 * | 7/2018 | Segal | H04N 7/15 |
| 10,075,676 B2 * | 9/2018 | Segal | H04N 5/262 |
| 2001/0006382 A1 | 7/2001 | Sevat | |
| 2002/0186233 A1 | 12/2002 | Holtz et al. | |
| 2004/0015398 A1 | 1/2004 | Hayward | |
| 2005/0137958 A1 | 6/2005 | Huber et al. | |
| 2005/0204438 A1 | 9/2005 | Wang | |
| 2006/0075668 A1 | 4/2006 | Sauer | |
| 2007/0089134 A1 | 4/2007 | Stearns | |
| 2007/0266322 A1 | 11/2007 | Tretter | |
| 2008/0033806 A1 | 2/2008 | Howe | |
| 2008/0096175 A1 | 4/2008 | Du Toit et al. | |
| 2008/0109300 A1 | 5/2008 | Bason | |
| 2008/0150913 A1 | 6/2008 | Bell et al. | |
| 2009/0066690 A1 | 3/2009 | Harrison | |
| 2009/0153804 A1 | 6/2009 | Giraldo et al. | |
| 2009/0237565 A1 | 9/2009 | Staker et al. | |
| 2010/0083191 A1 | 4/2010 | Marshall | |
| 2010/0174783 A1 | 7/2010 | Zarom | |
| 2011/0161990 A1 | 6/2011 | Smith | |
| 2011/0202827 A1 | 8/2011 | Freishtat | |
| 2011/0249075 A1 | 10/2011 | Abuan et al. | |
| 2011/0254912 A1 | 10/2011 | Mock et al. | |
| 2011/0298935 A1 | 12/2011 | Segal | |
| 2012/0158524 A1 | 6/2012 | Hintz | |
| 2013/0031593 A1 | 1/2013 | Booth | |
| 2013/0073985 A1 | 3/2013 | Hamlin et al. | |
| 2013/0117129 A1 | 5/2013 | Brown et al. | |
| 2013/0155187 A1 | 6/2013 | Skyberg | |
| 2013/0173355 A1 | 7/2013 | Barcenas | |
| 2013/0212615 A1 | 8/2013 | Schultz | |
| 2014/0002581 A1 | 1/2014 | Bear et al. | |
| 2014/0132702 A1 | 5/2014 | Leibovich et al. | |
| 2014/0215542 A1 | 7/2014 | Terpe | |
| 2015/0149930 A1 | 5/2015 | Walkin et al. | |

FOREIGN PATENT DOCUMENTS

| | | |
|---|---|---|
| WO | WO 2012/139082 | 10/2012 |
| WO | WO 2013/076478 | 5/2013 |
| WO | WO 2013/167901 | 11/2013 |

* cited by examiner

INTELLIGENT VIRTUAL ASSISTANT SYSTEM AND METHOD

CROSS-REFERENCE TO RELATED APPLICATION

This application is a continuation of U.S. patent application Ser. No. 15/867,639, filed Jan. 10, 2018, which is based on and claims priority to U.S. Provisional Patent Application No. 62/444,525, filed Jan. 10, 2017, U.S. Provisional Patent Application No. 62/545,994, filed Aug. 15, 2017, and U.S. Provisional Patent Application No. 62/565,094, filed Sep. 28, 2017. U.S. patent application Ser. No. 15/867,639 further is a continuation-in-part of U.S. patent application Ser. No. 15/683,403, filed Aug. 22, 2017, which is a continuation of U.S. patent application Ser. No. 15/247,534, filed Aug. 25, 2016, now U.S. Pat. No. 9,787,945, issued Oct. 10, 2017, which is based on and claims priority to: U.S. Provisional Patent Application No. 62/209,727, filed Aug. 25, 2015; U.S. Provisional Patent Application No. 62/242,029, filed Oct. 15, 2015; and U.S. Provisional Patent Application No. 62/329,081, filed Apr. 28, 2016, further, U.S. patent application Ser. No. 15/247,534 is based on and is a continuation-in-part to U.S. patent application Ser. No. 14/833,984, filed Aug. 24, 2015, now U.S. Pat. No. 9,661,256, issued May 23, 2017, which is a continuation-in-part to U.S. patent application Ser. No. 14/316,536, filed Jun. 26, 2014, now U.S. Pat. No. 9,363,448, issued Jun. 7, 2016, which claims priority to U.S. Provisional Application No. 61/839,757, filed Jun. 26, 2013 and U.S. Provisional Application No. 61/845,743, filed Jul. 12, 2013, the contents of all of which are incorporated by reference in their respective entireties, as if set forth herein.

FIELD

The present application relates, generally, to content presentation and, more particularly, to a system and method for providing and interacting with content, such as during interactive communication sessions and in development of interactive coordinated presentations.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

One of the biggest missed opportunities of the entire category of smart TV connected devices is the absence of easy to deploy video conferencing. As millions of consumers place these devices in their living rooms the core use case of facilitating communications via the large screen TV is missing.

It is with respect to these and other considerations that the disclosure made herein is presented.

BRIEF SUMMARY

The present application includes a computer-implemented system and method for providing an intelligent virtual assistant for generating and using respectively customizable interactive audio/video content to each of a plurality of computing devices during a networked communication session. Input is received by least one processor configured by instructions on non-transitory processor readable media. The input is received over a networked communication session from at least one device configured to provide the input. The at least one processor determines, as a function of information provided in or with the input, that the input is at least one of speech input, facial input, gesture input and textual input. Where the input is speech input, the at least one processor processes signals in the speech input using artificial intelligence to interpret at least one spoken word. Where the input is facial input, the at least one processor processes the facial input using artificial intelligence to interpret at least one expression. Where the input is gesture input, the at least one processor processes the gesture input using artificial intelligence to interpret at least one message or command. Where the input is textual input, the at least one processor processes the textual input using artificial intelligence to interpret at least one written word. Machine-based learning is performed by the at least one processor, using at least some of the processed input. Thereafter, the intelligent virtual assistant is provided for the respectively customizable interactive audio/video content as a function of the machine-based learning process via at least one of the plurality of computing devices. At least one of the plurality of computing devices and at least one additional computing device is configured via a gesture-based user interface to enable user-based selection and respective manipulation of at least a portion of the customizable interactive audio/video content that results in a customized representation of the customizable interactive audio/video content at a particular one computing device that is not represented at a particular other computing device.

In one or more implementations, the present application further includes performing, by the at least one processor, natural language processing, including at least one of speech recognition, natural language understanding, and natural language generation. Further, the at least one processor performs semantic search processing as a function of at least some results of the natural language processing.

In one or more implementations, the gesture based input includes hand gestures.

In one or more implementations, the present application further includes performing, by the at least one processor, optical character recognition to derive at least some of the textual input.

In one or more implementations, the intelligent virtual assistance is provided during generation of an interactive coordinated presentation, and/or prior to or during an on-line interactive video conference.

In one or more implementations, the present application further includes configuring, by the at least one processor, at least one of the computing device(s) to present the customizable interactive audio/video content on a display via an Internet media extender.

In one or more implementations, the intelligent virtual assistant includes at least one of inserting images, answering queries, writing, drawing, define an action item, and define an agenda item.

In one or more implementations, the present application further includes storing, by the at least one processor, at least some of the processed input, and using, by the at least one processor, at least some of the stored processed input for additional intelligent virtual assistance.

In one or more implementations, the facial input includes facial expressions and is received via a camera configured with one of the plurality of computing devices.

In one or more implementations, the present application further includes proactively providing, by the intelligent virtual assistant, suggestions to a user of at least one of the plurality of computing devices.

Other features and advantages of the present invention will become apparent from the following description of the invention that refers to the accompanying drawings.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION

Figure 1:
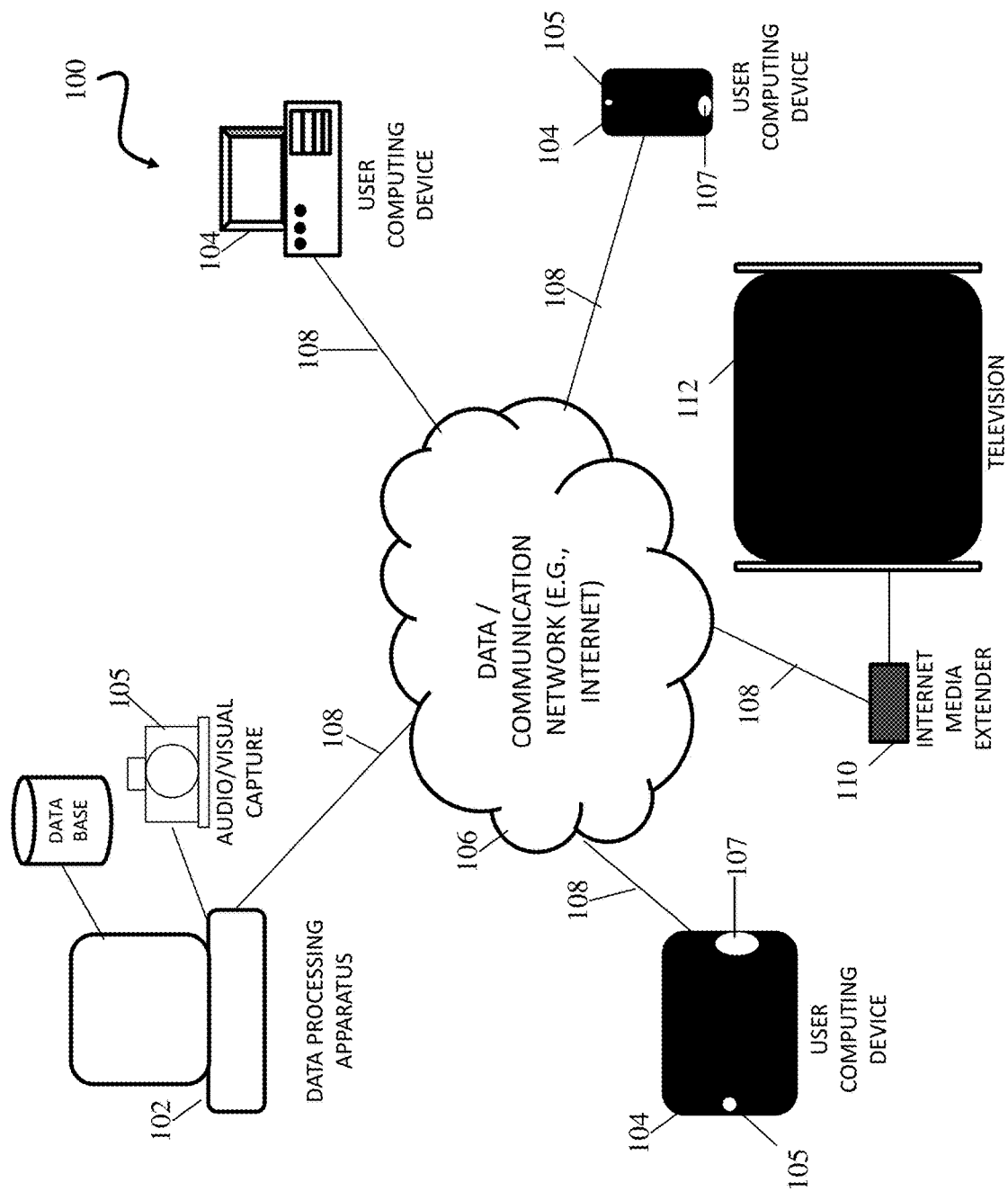
FIG. 1 is a diagram illustrating an example hardware arrangement that operates for providing the systems and methods disclosed herein.

By way of overview and introduction, the present application provides systems and methods for facilitating on-line meetings, and for managing content and information provided during online meetings, as well as for generating and managing archives of online meetings. In addition, the present application provides for an artificial intelligent agent that assists with generating interactive coordinated presentations and/or online meetings. For example, discussions that take place during a meeting can be automatically transcribed into electronic text. In one or more implementations, systems and methods disclosed herein are implemented as a function of one or more artificial intelligent agents. The agents provided with the present application can be configured to interface with a plurality of computer-based (e.g., software) agents that operate in disparate computing environments. Such interaction enhances meeting sessions, and representations of meetings can be enhanced as a function of content that is retrieved from a multitude of sources and provided via one or more of the agents. For example, the content can be retrieved in response to request(s) from a user or can be retrieved independently and proactively, such as via real-time analysis of user discussions and other activity that is "observed" during the meeting.

By way of introduction and overview, in one or more implementations the present application provides systems and methods for providing interactive video content, including on-line video conferencing, over one or more data communication networks, such as the Internet. Devices operating, for example, iOS, ANDROID, WINDOWS MOBILE, BLACKBERRY, MAC OS, WINDOWS or other operating systems are configured with one or more software applications that provide functionality, such as with an interface for developing ("authoring") distributable coordinated presentations. Such presentations can include interactive video having customizable and interactive functionality for and between devices with a plurality of end-users who receive the video. Further, the one or more software applications configure a user computing device with a viewing/interactive tool, referred to herein, generally, as a "consuming" interface for end-users who receive interactive video that are authored in accordance with the present application and usable for end-users to communicate (e.g., via interactive video conferencing functionality). Using the client interface, users may interact with each other and share interactive videos and other content as a function of touch and gestures, as well as graphical screen controls that, when selected, cause a computing device to execute one or more instructions and effect various functionality. For example, a smartphone or other mobile computing device can be configured via one or more applications in accordance with the ability to simulate a laser pointer, drawing tool, mouse, trackball, keyboard or other input device.

In accordance with the teachings herein, implementations of the present application provide a simple to use, informing and entertaining communications experience that incorporates content from a plurality of computing devices, e.g., smartphones, tablets, laptops and desktops, and enables live sharing in a real-time and conferencing capability therefore. In one or more implementations, one or more televisions can be used for respective audio/visual display devices, and can provide feed from cameras and/or microphones configured with various local and/or remotely located computing devices that are communicating over data communication networks such as the Internet. A television can be implemented in the present application in various ways, such as via an Internet media extender provided by APPLE TV, ROKU, AMAZON FIRE TV or GOOGLE CHROMECAST. As used herein, an Internet media extender refers, generally, to a category of devices that provide for content to be streamed to a television, surround sound devices, and the like. Unlike functionality provided by known Internet media extenders, however, the present application facilitates integrating audio/video input capabilities of computing devices (e.g., microphones, cameras and software that drive and enhance audio/visual captures) into video-conferencing capabilities. The present application facilitates one or more of: one-to-one (1:1) video conferencing; group video conferencing; sharing and/or viewing of content provided on a plurality of computing devices, and interactive computing activities.

The present application improves live and online meetings, including by determining whether scheduled attendees are present and accounted for, and whether attendees are complying with a predetermined agenda during a meeting. Moreover, action items that are discussed during the meeting can be collected as a function of one or agent-based operations, and the action items can be assigned to one or more of the attendees, for example, during the meeting or shortly thereafter.

The present application can also be configured with technology to provide post-meeting summaries to attendees and other individuals as a function of recorded meeting discussions and/or analyzed content discussed during a meeting. The summaries can be configured in various ways, including in "smart" notes that include interactivity. In one or more implementations, the smart notes are configured as interactive video, such as shown and described in U.S. patent application Ser. No. 15/247,534, entitled SYSTEM AND METHOD FOR INTERACTIVE VIDEO CONFERENCING and filed Aug. 25, 2016, now U.S. Pat. No. 9,787,945, issued Oct. 10, 2017, and U.S. patent application Ser. No. 14/316,536, entitled SYSTEM AND METHOD FOR PROVIDING AND INTERACTING WITH COORDINATED PRESENTATIONS and filed Jun. 26, 2014, now U.S. Pat. No. 9,363,448, issued Jun. 7, 2016, which are each respectively incorporated by reference herein.

Post-meeting summaries that are generated in accordance with the present application can be particularly useful to allow attendees to participate during meetings without being distracted by a need to take detailed written notes. Additionally, due to the retrievable and interactive nature of meeting summaries generated in accordance with the present application, attendees can be provided with a valuable resource that enables improved participation in subsequent meetings. For example, prior to the start of a meeting or during a meeting, summaries of previous meetings can be generated, compiled and/or provided as a function of the present application, and can be provided to participants, such as on-demand or substantially automatically.

In at least one implementation, the present application includes technology that configures one or more processors to organize and store information regarding a series of previously held meetings that have some commonality into threads. In one or more implementations, a thread can retain the content from each meeting in the series (e.g., documents, meeting transcripts, summaries, smart notes, action items, etc.). Moreover and as noted herein, the present application can include at least one artificial intelligent agent, and in certain implementations, the artificial intelligent agent can be configured to communicate with one or more other artificial intelligent agents to perform certain tasks (e.g., to retrieve and/or configure data).

The present application applies technology, such a natural language processing ("NLP") and conversational software robot ("bot") technology with web services and deep learning, which configures the artificial intelligent agent of the present application to provide valuable opinions to users, substantially in real-time during or after a meeting. For example, the present application can be configured to receive a question from a user that asks for the agent's input. Based on an analysis of collective knowledge gathered from recordings, interactive video and other materials, the agent can form an opinion and make recommendations for the user. For example, the agent may recommend a particular course of action to take in the project. Furthermore, the artificial intelligent agent can monitor activity that occurs during a meeting, such as to track attendees' sentiment and general mood, and can even intervene to ensure that a meeting is on track, such as with respect to the agenda and/or the effectiveness thereof.

Moreover, the present application provides for virtual meeting facilitation, as a function of artificial intelligence and field agent connectivity. For example, artificial intelligent agent(s) interface and communicate with other online agents, which may be remotely located, to achieve various tasks. For example, an artificial intelligent agent of the present application organizes a "universe" of enhanced knowledge and provides users with such information rapidly. In practice, the artificial intelligent agent can record meetings, transcribe the recordings and take note of important decisions and points during meetings. Recording can be done continuously or periodically, and allows the artificial intelligent agent to act as a conduit to a collective memory of the organization's meetings, including to make content created from and/or provided during meetings into leveragable intellectual property that can be retrieved via advanced search abilities at any point during before or after meetings.

The artificial intelligent agent of the present application can be configured to monitor multiple forms of input throughout respective meetings. In addition to transcribing a meeting via a field connection to SIRI or other voice-based system, the present application includes functionality to utilize advanced deep learning driven algorithms to monitor participants sentiments and interest indications during meetings to arrive at an ability to provide accurate meeting minutes and summaries. One or more hardware devices can be configured, for example, with microphone(s), camera(s), light sensors, heat sensors motion sensors or other detection features that assist with monitoring participants and activity during meetings.

Accordingly, the artificial intelligent agent of the present application can be configured to detect audible input (e.g., "listen") and transcribe discussions that take place during meetings. Moreover, the artificial intelligent agent can index documents, as well as web-based assets being browsed by one or more participants during a meeting, such as for future retrieval. With a large and growing universe of skills, the artificial intelligent agent can be configured to allow attendees of a meeting to rapidly retrieve content thereby enhancing collaboration. The artificial intelligent agent can further be configured to lend a hand for drawing virtually anything upon request, such as on a virtual whiteboard. Further, the artificial intelligent agent can facilitate rapid text entry via voice-based entries, thereby accelerating ideation and reducing friction from thought to sharable visualization of ideas.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present application.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present application, including image files, video content, documents, audio/video recordings, metadata and other information. In addition, data processing apparatus 102 can be configured to access Internet websites and other online content. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other software and/or hardware tools, to provide received data on audio/visual devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

According to an embodiment of the present application, user computing device 104 provides user access to data processing apparatus 102 for the purpose of receiving and providing information. Examples and description of specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2:
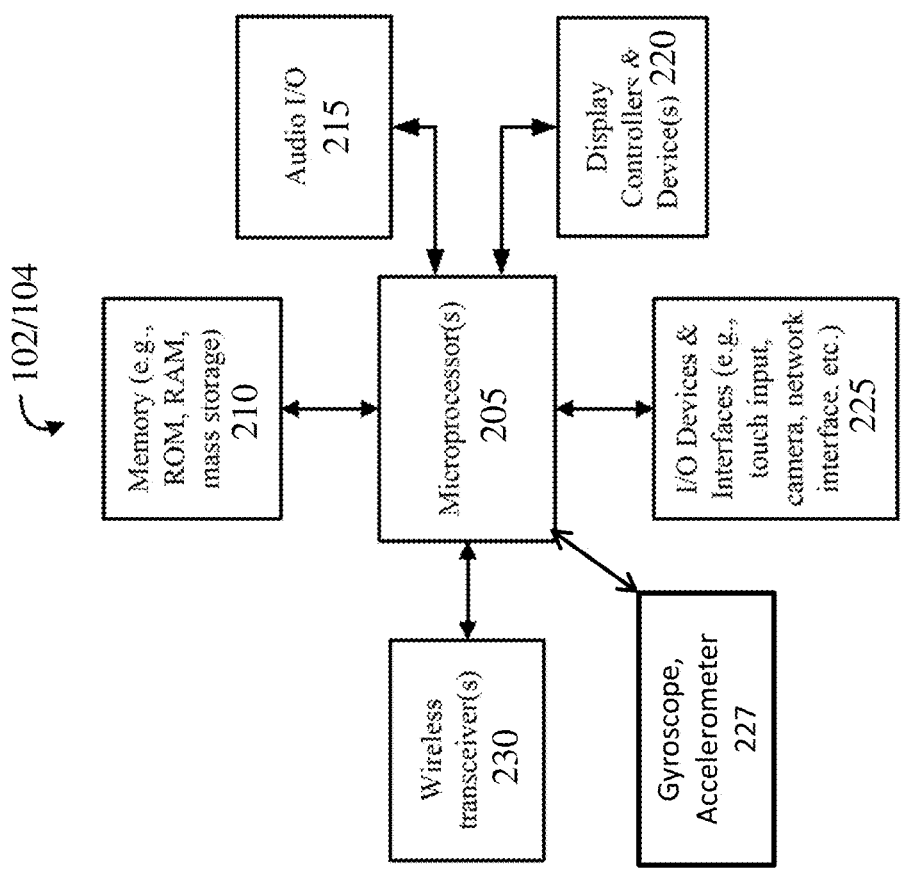
FIG. 2 is a block diagram that illustrates functional elements of a computing device in accordance with an implementation of the present application.

FIG. 2 illustrates, in block diagram form, an exemplary data processing apparatus 102 and/or user computing device 104 that can provide functionality in accordance with interactive conferencing, as described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type of memory.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running mobile computing device operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

In one or more implementations, the present application provides improved processing techniques to prevent packet loss, to improve handling interruptions in communications, to reduce or eliminate latency and other issues associated with wireless technology. For example, in one or more implementations Real Time Streaming Protocol (RTSP) can be implemented, for example, for sharing output associated with a camera, microphone and/or other output devices configured with a computing device. RTSP is an effective (though not necessary in all implementations) network control protocol for entertainment and communications systems, including in connection with streaming output. RTSP is used in the present application, at least in part, for establishing and controlling media sessions between various end points, including user computing devise 104, Internet media extender 110 and data processing apparatus 102.

In addition to RTSP, one or more implementations of the present application can be configured to use Web Real-Time Communication ("WebRTC") to support browser-to-browser applications, including in connection with voice, video chat, and peer-to-peer ("P2P") file sharing. Thus, the present application avoids a need for either internal or external plugins to connect endpoints, including for voice/video or other communication sharing. In one or more implementations, the present application implements WebRTC for applications and/or Internet web sites to capture and/or stream audio and/or video media, as well as to exchange data between browsers without requiring an intermediary. The set of standards that comprises WebRTC makes it possible to share data and perform teleconferencing peer-to-peer, without requiring that the user install plug-ins or any other third-party software. WebRTC includes several interrelated APIs and protocols which work together.

In one or more implementations, at least one of the Internet media extender components 110 includes APPLE TV. After an Internet media extender 110 is installed (e.g., connected to a television set and connected to a Wi-Fi, Ethernet or other local area network), a software application is installed on the Internet media extender 110, as well as at least one mobile computing device 104. For example, a user downloads and installs an app to an Internet media extender 110 ("TV APP") and also installs an app to a user computing device 104 ("MOBILE APP"). Once installed, and the first time the TV APP is executed, the user is prompted to launch the MOBILE APP. Thereafter, the mobile computing device 104 (e.g., an iPhone) is automatically detected by the TV APP. During subsequent uses, video content that is provided as a function audio/video output from the computing device (e.g., iPhone) is provided instantly on the television that is connected to the Internet media extender 110. In operation, audio/video feed from the iPhone is provided on big screen. The TV APP and the MOBILE APP may be configured as a single application (e.g., distributed as a single application), or may be provided as separate applications.

In one or more implementations, each of a plurality of participants operating, for example, user computing device 104 participate in an interactive video conference at least in part by establishing a data/communication session with the data processing apparatus 102. A form of a star topology is established, in which data processing apparatus 102 is communicatively connected to each of a plurality of respective user computing devices 104 and respectfully receives audio/video feed from each device, such as provided as a function of input from a respective camera and/or microphone.

Thus, in one or more implementations, the present application can implement a star topology in which a central node (e.g., a data processing apparatus 102) receives low resolution of video content from each of a plurality of computing devices (e.g., client devices 104). The central node can be configured by executing program instructions to compose a single video comprising all of the video received from the various devices. The single video can be provided substantially in real-time as one high-definition ("HD") video. The central node can send the HD video to all of the computing devices operated by the various users, as well as to the device operated by the "presenter."

Continuing with the respective one or more implementations described above, each of the respective individual feeds from the respective devices is received by the data processing apparatus 102 and the video feeds (including, for example, images) are composed into a single video stream. The video stream can be configured as a high definition stream (e.g., 1280×720 or higher resolution), and output to each of at least some of the respective user computing devices 104.

Figure 3:
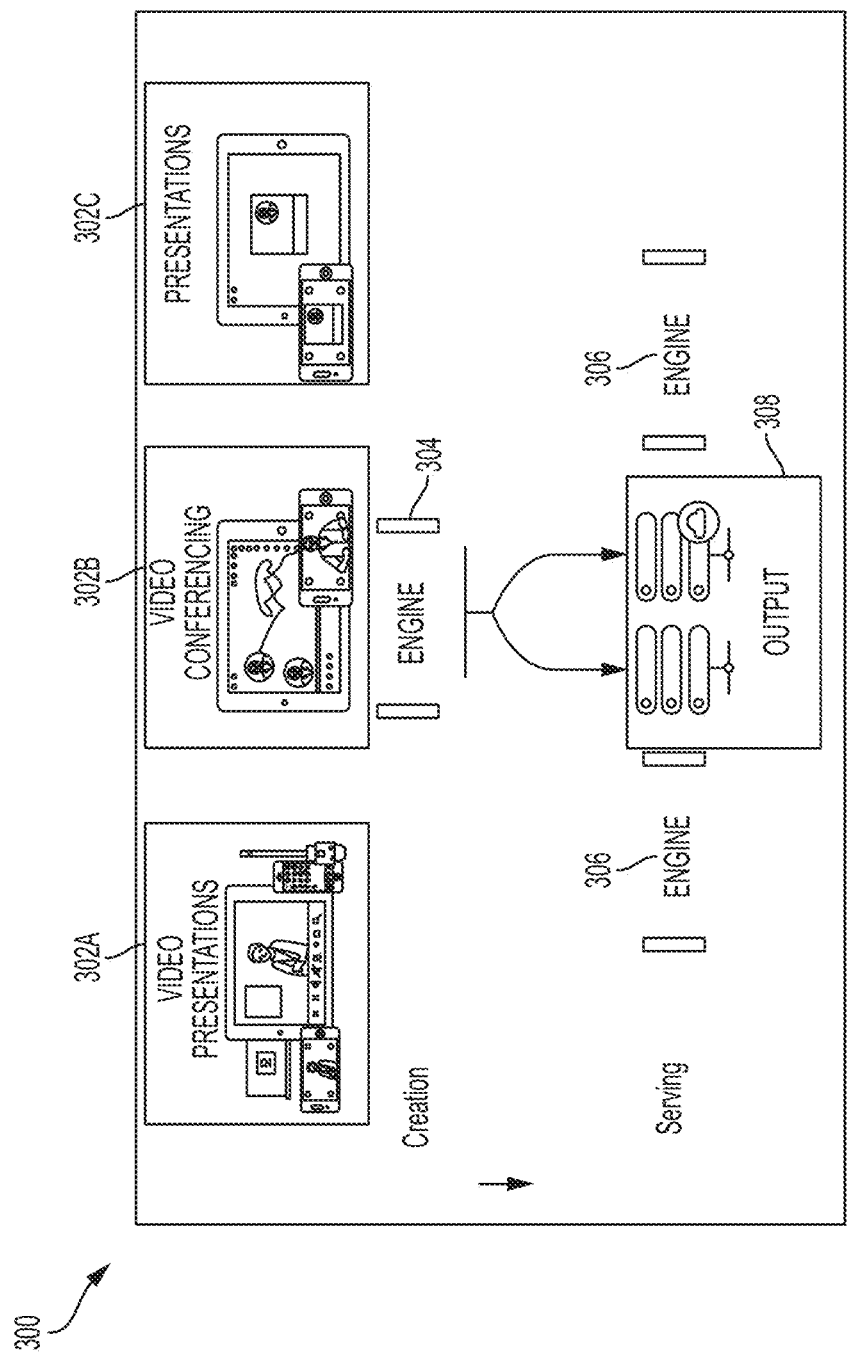
FIGS. 3-5 are example high-level diagrams that illustrate interactivity between and functionality of various modules in connection with one or more implementations of the present application.
Figure 4:
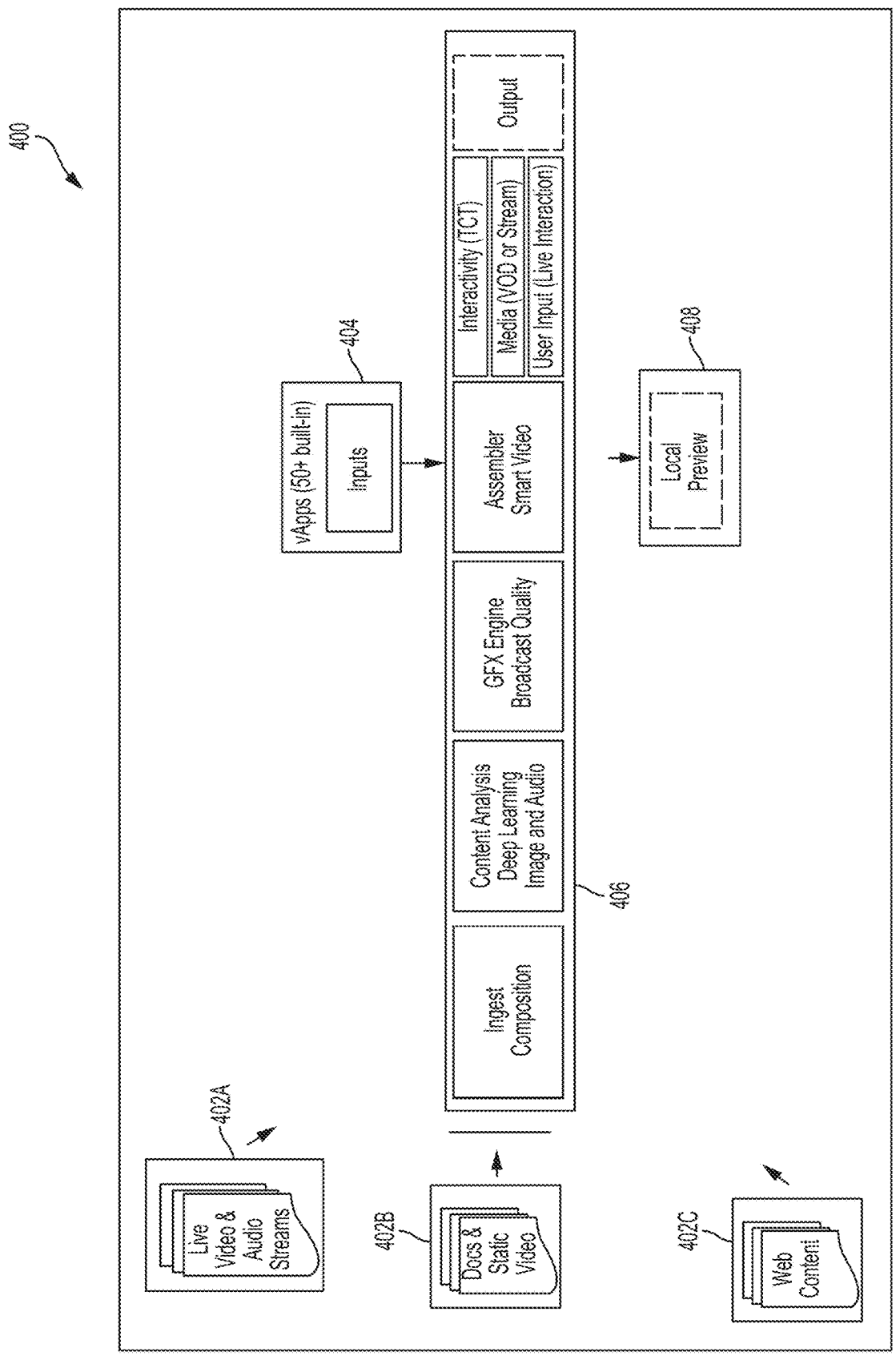
Figure 5:
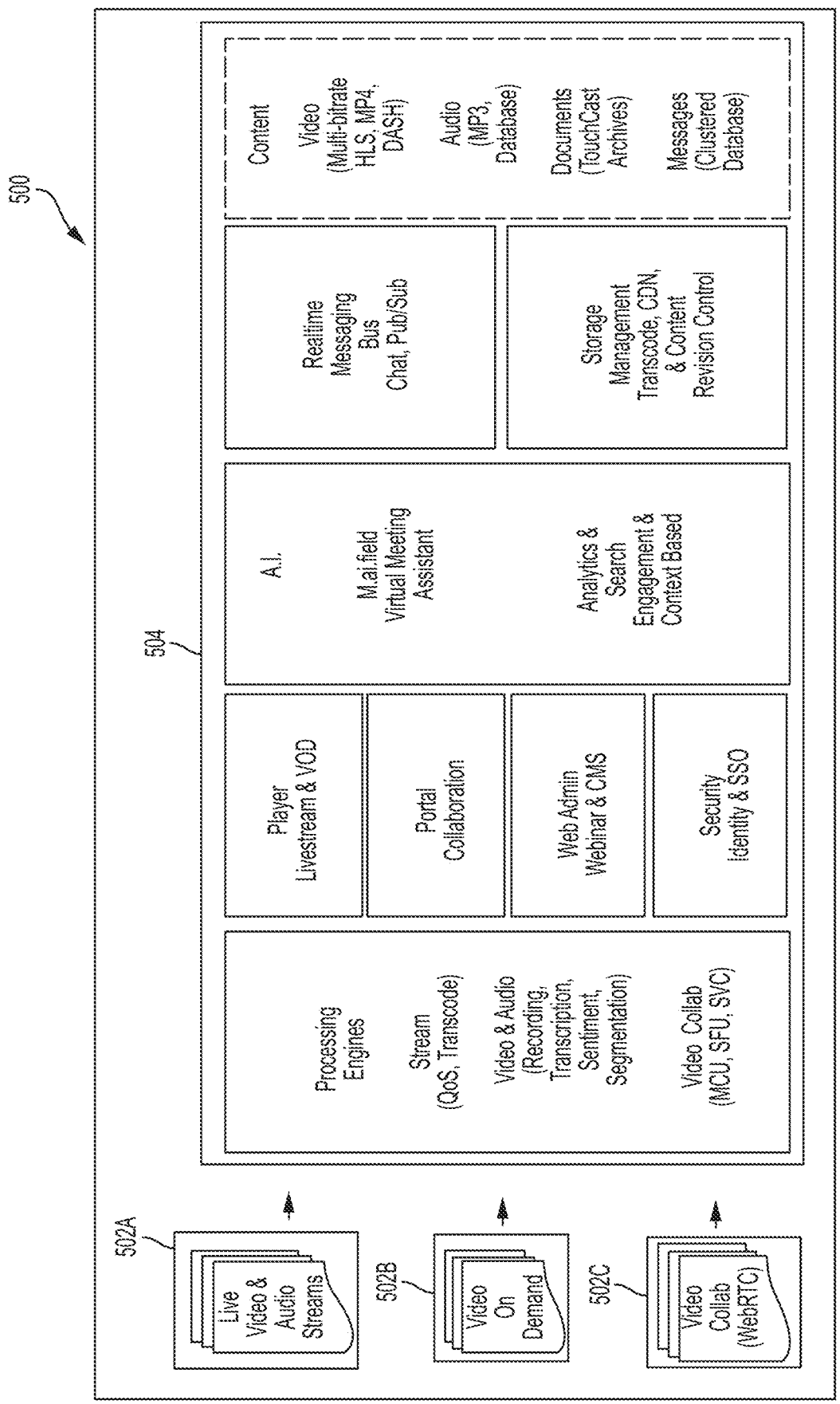

FIGS. 3-5 are example high-level diagrams that illustrate interactivity between and functionality of various modules in connection with one or more implementations of the present application, and that enhance production value and assist in virtually any form of content. In one or more implementations, events are packaged into memory for useful media for future use, such as on-demand content and/or an extension of organizational-based content. In the example block diagram 300 illustrated in FIG. 3, coordinated presentations can be made of one or more video presentations 302, interactive video conferencing 302 and other presentations 302, and interactive video can be generated therefrom and created via one or more respective layers, including video presentation layer 302A, video conferencing layer 302B and presentation layer 302C. Presentation layer 302C can include, for example, online applications that are suitable for generating slide decks, outlines, or other suitable digital aids. In certain implementations, a plurality of parties can connect to a respective videoconferencing session in accordance with the present application. In such instances, a client/server model can be effective for handling the respective devices and management of data and communications thereof. In other certain implementations, one or more individuals connect to a respective videoconferencing session in accordance with the present application. In such cases, a P2P framework can be effective in an implementation. Interactivity can be developed and/or controlled by vApps, and all interactions of users associated with developed video and/or viewing thereof can be stored. In one or more implementations, metadata can be generated that represents such interactions and/or events that are part of a respective video presentation. A video layer, in one or more implementations, includes a composition of all elements including live, streamed content, as well as prerecorded video and audio. Representations of all the included content can be packaged into a single video file, as well as metadata and other useful information associated with the content. For example, user input stores data streams generated during a respective interactive video, such as whiteboard drawings and video viewer feedback during the live streaming sessions. Engine 304, for example, can include an endpoint configured as one or more backend servers that supports and provides functionality associated with respective native applications (e.g., 302A, 302B and 302C). Engine 306, for example, can include a real-time collaboration platform configured as one or more scalable backend servers and that is usable in consumer-based and/or enterprise operations. The serving component of engine 306 can process output from engine 304, for example, for use such as shown and described herein.

FIG. 4 is an example block diagram showing alternative components and modules 400 associated with one or more implementations of the present application. Modules 402A, 402B and 402C can produce or provide live video and audio streams (402A), documents files and static video (402B), and web content (402C). Other inputs 404, such as vApps can be provided as well. Such content and inputs can be received by module 406 that includes an "ingest" module for respective compositions, a content analysis module that can include artificial intelligence (e.g., "deep learning"), for example associated with image and audio content, a graphics effects (GFX Engine) module that can output high-quality (broadcast quality or better) content. Moreover, an assembler module can be included to package the respective content, metadata, and other information into a single file (e.g., "smart video"). In one or more implementations, a proprietary file format can be used and/or generated, such as a ".TCT" file format that is associated with engine 306, and operable to be played on a content player application or other suitable software, for example operating on a user computing device 104, and that is configured to play such .TCT file. Media (such as interactive video, video-on-demand (VOD) and/or user input (live interaction) can be bundled into output 308. Such output can be previewed locally (408) and/or played on a player application operating on user computing device 104.

With reference to FIG. 5, a plurality of modules 500 are illustrated in accordance with one or more implementations of the present application. Video and audio streams module 502A, video-on-demand module 502B and video collaboration 502C, are represented to provide content to modules 504, such as to processing engines for eventual use, such as in a player (for a live stream and or video-on-demand), a portal (such as for collaboration), web administration (such as for webinars and/content management systems) and/or security applications (e.g., identity and single sign-on (SSO)). In addition, artificial intelligence modules are supported and/or provided, for example, for virtual meeting assistants, and learning modules such as in connection with analytics and for providing search functionality for users in connection with packaged output 308. Artificial intelligence modules are useful in addition for user engagement and for context-based functionality (e.g., searching). Also illustrated in modules section 504 is a communications module, such as a real-time messaging bus for chat and various publishing and subscription implementations (Pub/Sub). Storage management modules are also provided, such as to transcode content (e.g., from one encoding format to another), and content delivery networks (CDN).

In one or more implementations, the respective modules illustrated in FIGS. 3-5 provide output that is packaged with metadata and usable information for, for example, a player application operating on a user computing device 104. The player application operating on user computing device 104, for example, "ingests" the content and pushes out interactive "smart" video. A ".TCT" file, for example, has video or other multimedia, textual and/or static content, as well as metadata and other instructional information, and is recognized and played on such player application. In one or more implementations, optical character recognition (OCR), voice recognition and/or audio recognition operations can be executed by one or more processors operating on user computing device 104 and/or data processing apparatus 102 to generate transcriptions, which can be formatted as metadata, of content contained in the ".TCT" file. In one or more implementations, a player application operating on user computing device 104 can be configured with instructions that, when executed by computing device 104, provide search functionality for the user to locate content and material contained within the file. Upon receipt of search criteria, such as keywords or other search terms, search functionality can be executed within the player application to locate corresponding content within the video content packaged file.

One or more implementations of the present application, artificial intelligence module(s), such as provided via modules 504, form various machine learning, including deep learning, such as in connection with convolutional and other neural networks, and results in detecting and characterizing sentiment in connection with one or more images, including was in video. For example, analysis of images that include smiling, frowning, crying, wincing or other expressions is performed to identify specific kinds of content and to generate suitable metadata, such as to enable users to locate such content within video. Metadata can be generated automatically as a function of modules 406 and 504 via engines 304 and 306, for example. Moreover, as content is edited (such as video, audio or images) in a packaged video file, the metadata can be automatically edited as well to provide functionality and operations, such as shown and described herein, and kept up-to-date as such files are edited.

Thus, in one or more implementations, as a player application operating, for example, on a user computing device 104 ingests a packaged multimedia file, such as interactive video shown and described herein, voice recognition, optical character recognition or other processing occurs substantially in real-time to generate analytics for additional functionality. One of ordinary skill will recognize that such a player application operating on a user computing device 104 can be configured as a client application running as a stand-alone application or a mobile app, or may be operating in an online environment, such as via a web browser or other suitable online software application.

In one or more implementations, the present application provides a sophisticated database management environment that operates substantially in real-time and on a plurality of respective user computing devices 104. Interactive video content can be provided in a player application with a set of graphical user controls, such as to represent a timeline of content and events contained within the interactive video. Additionally, respective events and/or content can be indexed within the timeline and user-defined weights can be applied thereto that represent a degree of interest in respective events and/or content. An event can be defined automatically and in various ways, such as when a change in content is detected in the interactive video. A change in content can include, for example, a new presentation slide being displayed. Other examples of changes in content can include a different person speaking in a videoconference session or a video presentation. Yet another example can include user interaction in connection with a videoconference or video presentation. For example, a videoconference that has been packaged for distribution in connection with the teachings herein may include, at one point during the session, a heated exchange among the respective participants. An event can be defined as the moment when the heated exchange begins. Countless other events and content can be identified and defined automatically and/or manually in connection with the teachings herein.

Figure 6:
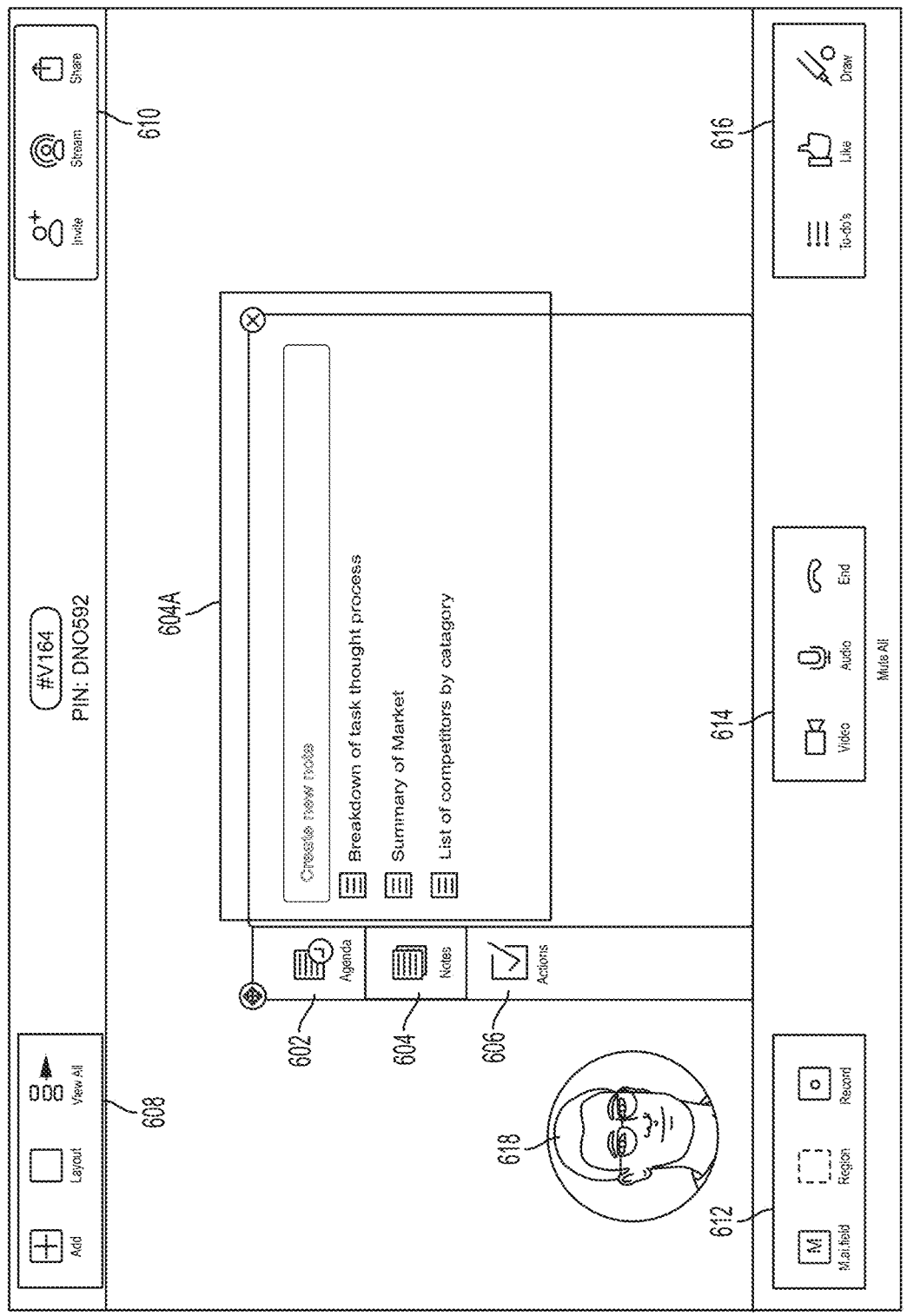
FIG. 6 illustrates an example data entry display screen that includes features and controls for users before and/or during an interactive video conference, and/or during development of the interactive coordinated presentation, in accordance with an implementation of the present application.

Referring now to FIG. 6, an example data entry display screen 600 is illustrated that includes features and controls for users before and/or during an interactive video conference, and/or during development of the interactive coordinated presentation. An illustrated in example display screen 600, the present application includes features, such as buttons 602, 604 and 606, that can be configured as a control console allowing the user to manage various types of elements. In the example shown in FIG. 6, agenda item 602 can include options and controls for meetings and timing, including for stages thereof, including for options and meeting flow. Notes item 604 provides options for document creation and editing, including for a team to co-edit during a respective meeting session and/or across meeting sessions in a given thread. Also shown in example screen 600 is notes editing section 604A, which illustrates an example notes that is a persisted thread/meeting room name. Action item 606 is a control that, when selected, enables action items to be defined and selected during a respective meeting by participants. In one or more implementations, action items can be configured as strings with a respective status identifier. Thereafter, the action items can be assigned to member(s) of a respective meeting or team.

In the example display screen 600, shown in FIG. 6, additional groups and controls can be provided for users to have additional functionality before or during an interactive video conferencing session. For example, layout options 608 includes options for users to add options, create or adjust a respective layout, and to view all options. Also shown is layout area 610, which includes options for users to invite other users to a respective session, stream content, such as over a communication network such as the Internet, and to share content, such as by email, SMS, file transfer, or other suitable protocol. Additional layout options illustrated in FIG. 6 include options section 612 the includes controls for adding an A/I field, adding a new region, and for recording content. Options section 614 include controls for video, audio, to terminate a session (and). Options section 616 include controls for adding a to-do list or similar action planning, to provide some feedback to content (e.g., a "Like" button), and a drawing control for, for example, annotating content substantially in real-time. Additionally, in one or more implementations, the present application supports providing a virtual representation 618 of one or more respective users that are interfacing via a respective video conferencing session in accordance with the teachings herein. For example, one or more modules can be implemented to simulate the viewpoint for the respective user, such as to appear that the user is located "behind" the display screen configured with, or otherwise accessible by, user computing device 104.

Figure 7:
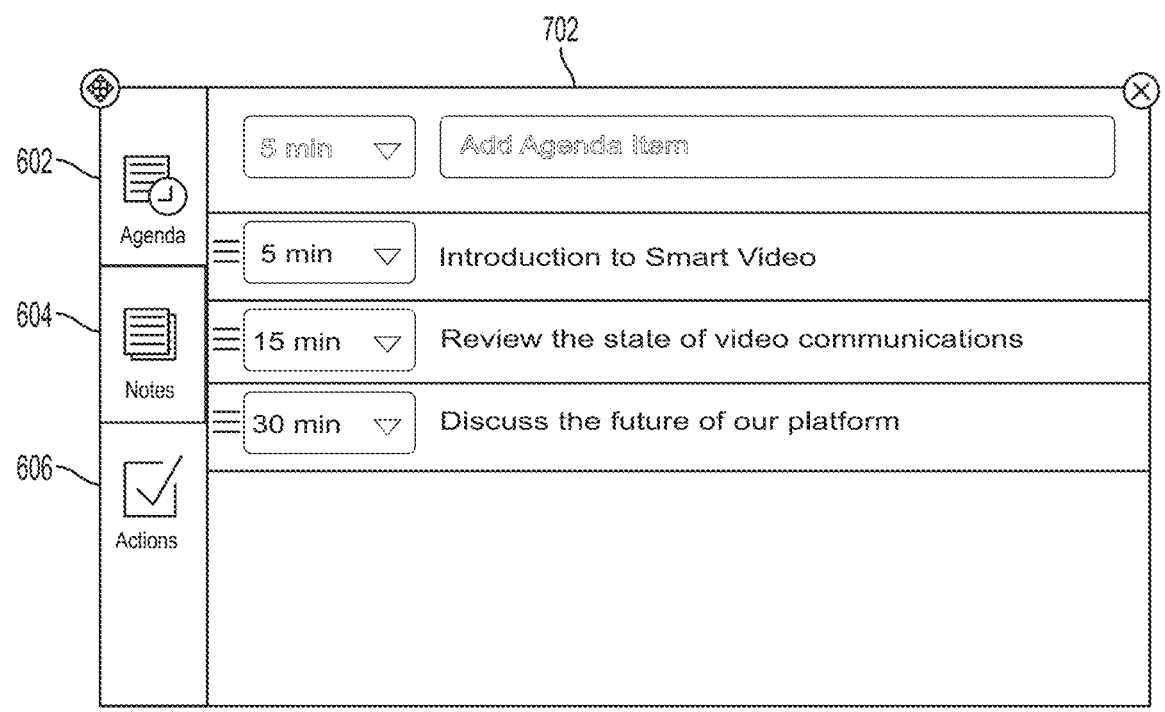
FIG. 7 illustrates example agenda items provided in accordance with one or more implementations of the present application.

FIG. 7 illustrates example agenda items 702 provided in accordance with one or more implementations of the present application. Apart from notes 604, agenda items 702 can be single modality items. During operation, agenda items 702 can be provided as a pop-up window, which can be configured as a web container, and that responds to user activities, such as to be dragged and scaled to different sizes. In one or more implementations, user(s) may add an agenda item, such as by selecting pulldown values to specify the length of a respective meeting segment. Scrolling functionality can be provided in case of display limitations, such as in view of values set forth by users.

In one or more implementations, a user can drag and drop items, such as to change order of agenda items, change the length of agenda items, tap to edit the text of agenda items, or perform other functions. Other user-based interactions, such as to swipe left or right can be provided to reveal options, such as "delete," "edit" or the like. Other functionality can be provided to receive user input, including voice-based input or input from other means. In one or more implementations, data processing apparatus 102 and/or user computing device 104 can be configured, such as by executing code, to provide options for users to control the display of agenda items, such as to scroll an agenda item at the bottom of a screen. Options can be provided for users to define and/or adjust display options, such as the speed at which items scroll, the colors of items, font types, point sizes, or the like.

Figure 8:
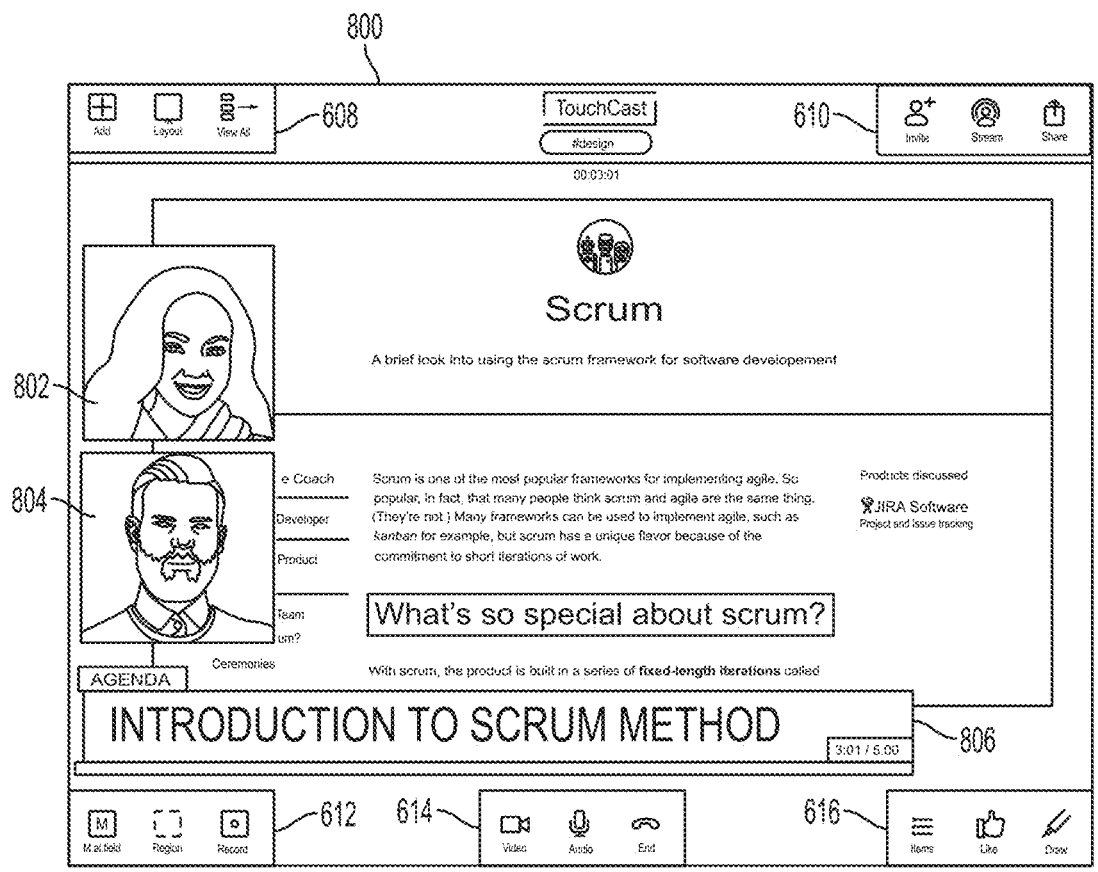
FIG. 8 illustrates an example data entry display screen, in accordance with an example implementation of the present application.

FIG. 8 illustrates an example data entry display screen 800 representing the interactive video conference and/or a coordinated presentation, in accordance with an example implementation of the present application. Two participants are illustrated as items 802 and 804, respectively. Also illustrated in display screen 800 is agenda item scrolling option 806, which displays the respective agenda item being discussed. A timing counter function is further illustrated, illustrating an amount of time that has passed and of a total duration ("3:01/5:00"). Other functionality and controls, such as described above with reference to FIG. 6, are included in display screen 800.

Figure 9A:
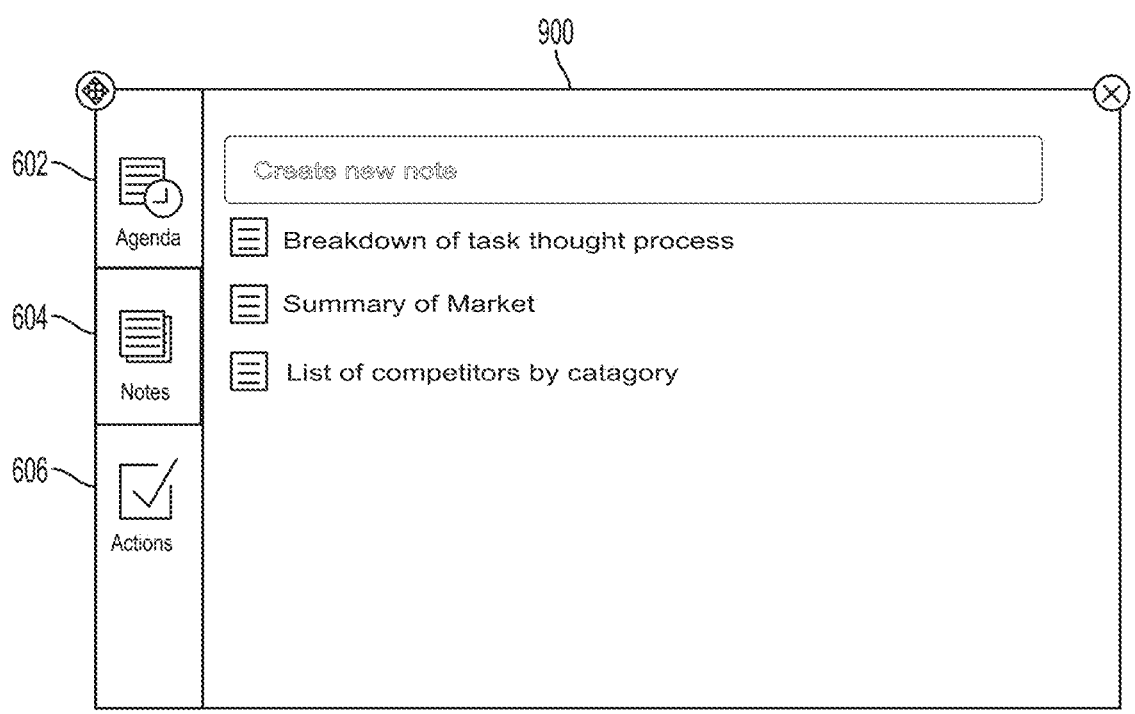
FIGS. 9A and 9B illustrates example notes items display screens, in accordance with an example implementation of the present application.
Figure 9B:
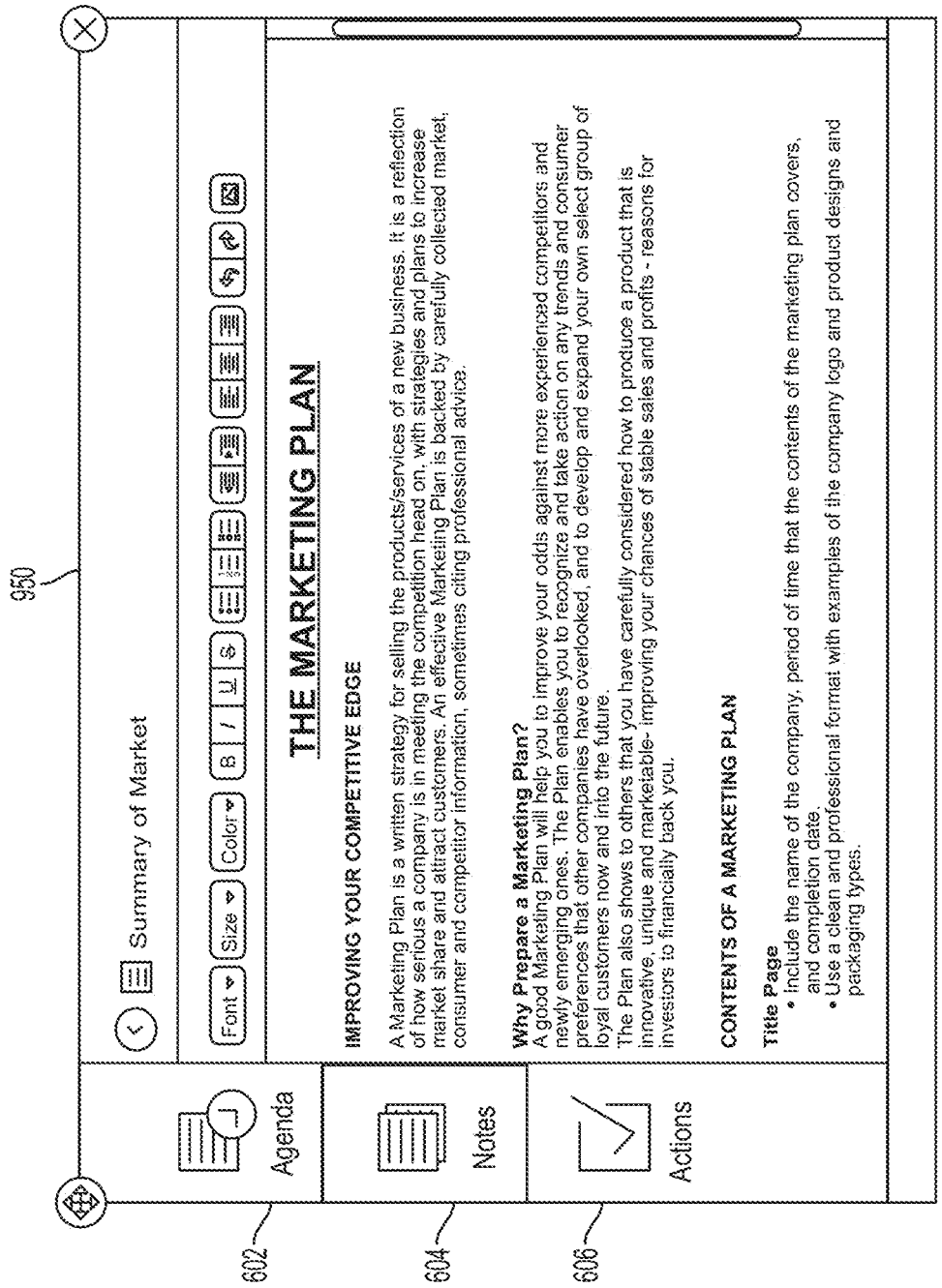

FIG. 9A illustrates example notes items display screen 900, provided in accordance with one or more implementations of the present application. Notes items 704 can be added, such as via a menu command or pop-up window. In the example display screen 900, notes can be added and/or the user can navigate to existing notes, simply by selecting one of the notes identified in the list. For example, the user can select the second item in the list shown in display screen 900 ("Summary of Market"), and the corresponding content can be automatically provided, such as shown in the display screen 950 in FIG. 9B. In one or more implementations, data processing apparatus 102 and/or user computing device 104 can be configured, such as by executing code, to provide users with functionality that enables the ability to drag to change order and delete items 604, such as in connection with agenda items 602 and action items 606.

Figure 10A:
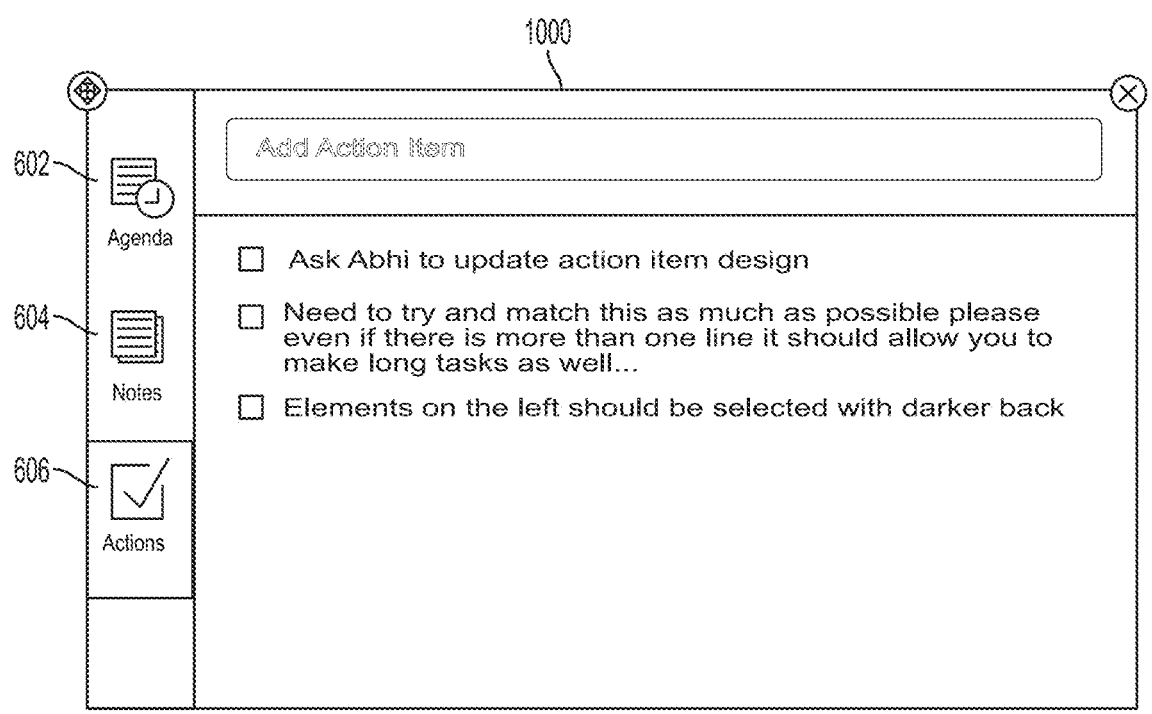
FIGS. 10A and 10B illustrate example action items display screens, in accordance with one or more implementations of the present application.
Figure 10B:
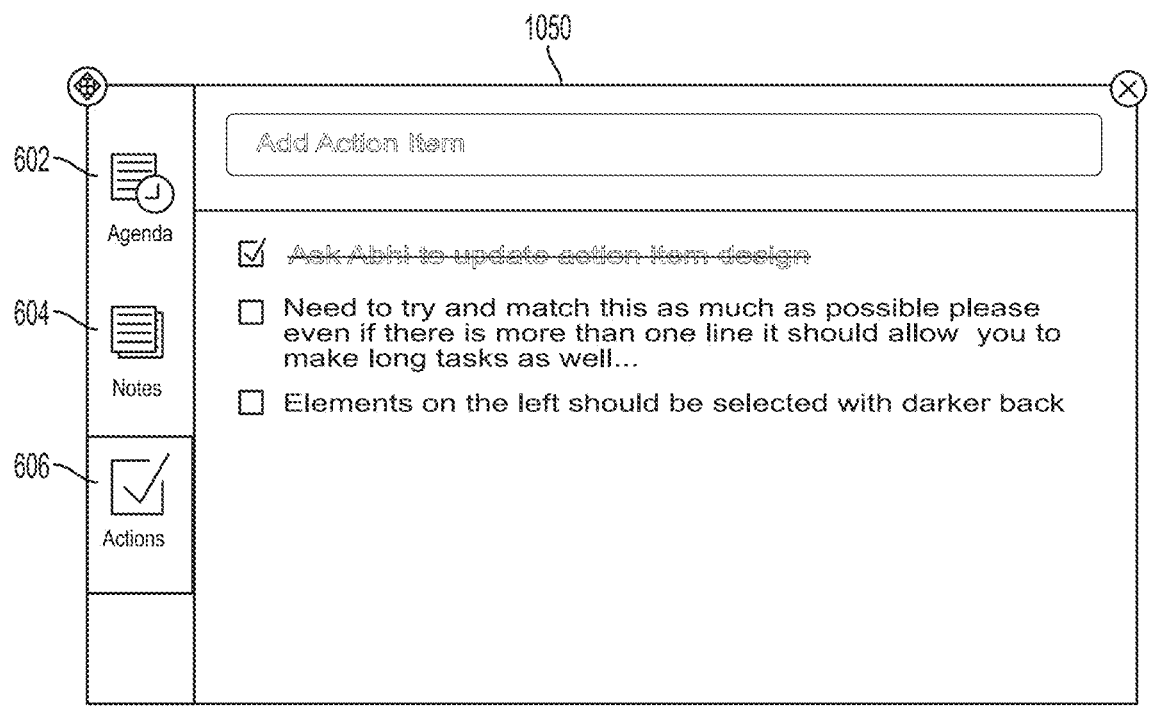

With reference now to FIGS. 10A and 10B, example action items display screen 1000 is displayed and provided in accordance with one or more implementations of the present application. A user can use the controls set forth therein to add an action item, such as simply by tapping on add action item and hitting enter to add. In addition, users can check an action item, which results in the item being formatted as crossed out or otherwise completed. An example is illustrated example display screen 1050, shown in FIG. 10B. Other functionality enables a user to swipe left to delete, add separator lines, or take virtually any other activity in accordance with a respective implementation.

As shown and described herein, a virtual smart assistant is provided that includes voice services. In one or implementations, data processing apparatus 102 and/or user computing device 104 can be configured, such as by executing code, to provide users with functionality to easily and quickly insert visual content and functionality, simply by using their voices. Users can also be provided with functionality that enables them to tap or click on a button set forth in respective area and, thereafter, drag and drop a rectangular area on a canvas. As a mouse button is released, a finger is lifted off the display screen, or other suitable action occurs, one or more systems operate in a "listen mode" for a subsequent user command. For example, a bounding box can be automatically filled with requested media or other information. Users may simply tap anywhere on the canvas and the system will make its own determination on the rectangular area to fill depending on the requested content.

Figure 11:
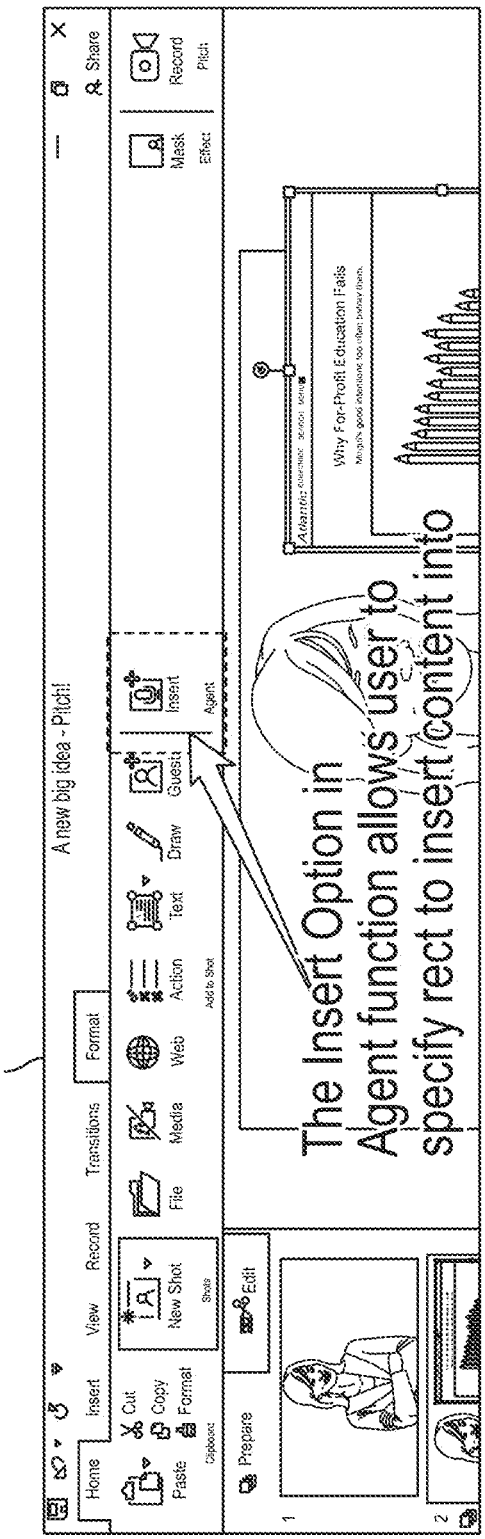
FIG. 11 illustrates an example data entry display screen that includes controls to insert content automatically as a function of a smart assistant, in accordance with an example implementation of the present application.

Examples of skills include the ability to insert an image, a website, answer general questions, set a to do item, draw, write and more. Furthermore, the present application can be configured to include a collection of self-service APIs, tools, documentation and code samples that make it fast and easy for users to add skills to train or otherwise customize the smart assistant. FIG. 11 illustrates an example data entry display screen 1100 that includes controls to insert content automatically as a function of a smart assistant.

Figure 12:
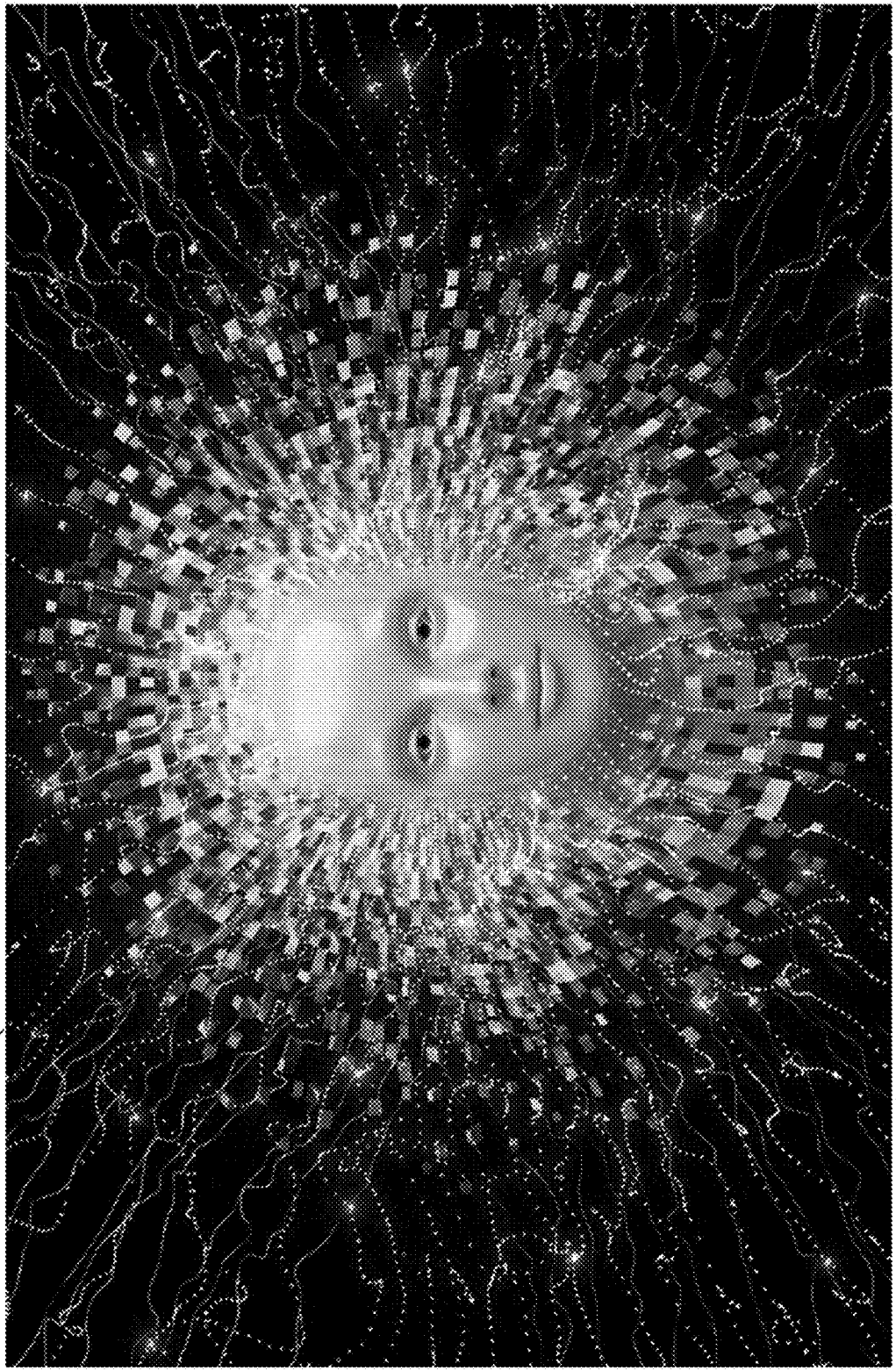
FIG. 12 illustrates an example artificial intelligent agent, in accordance with an implementation of the present application.

FIG. 12 illustrates an example artificial intelligent agent, in accordance with an implementation of the present application.

Figure 13:
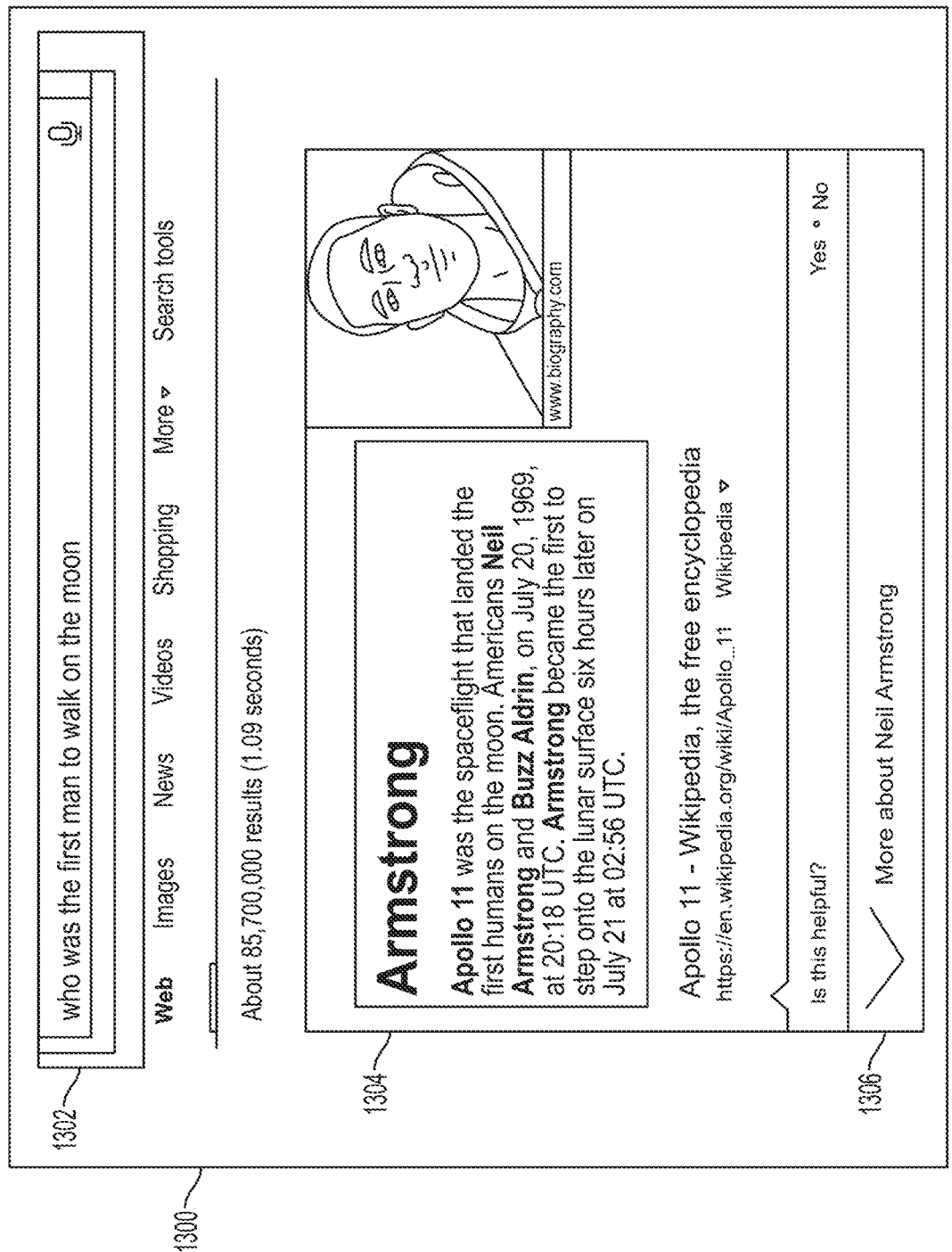
FIG. 13 illustrates an example display screen illustrating output from an artificial intelligent agent, in accordance with an implementation of the present application.

FIG. 13 illustrates an example display screen 1300 that includes output generated by an intelligent virtual assistant. Input 1302 includes a question posed by a user of a computing device 104, which is received via a microphone configured with the device 104. Further output 1304 is shown in response to the question, and proactive suggestion offering additional information is shown in section 1306.

Figure 14:
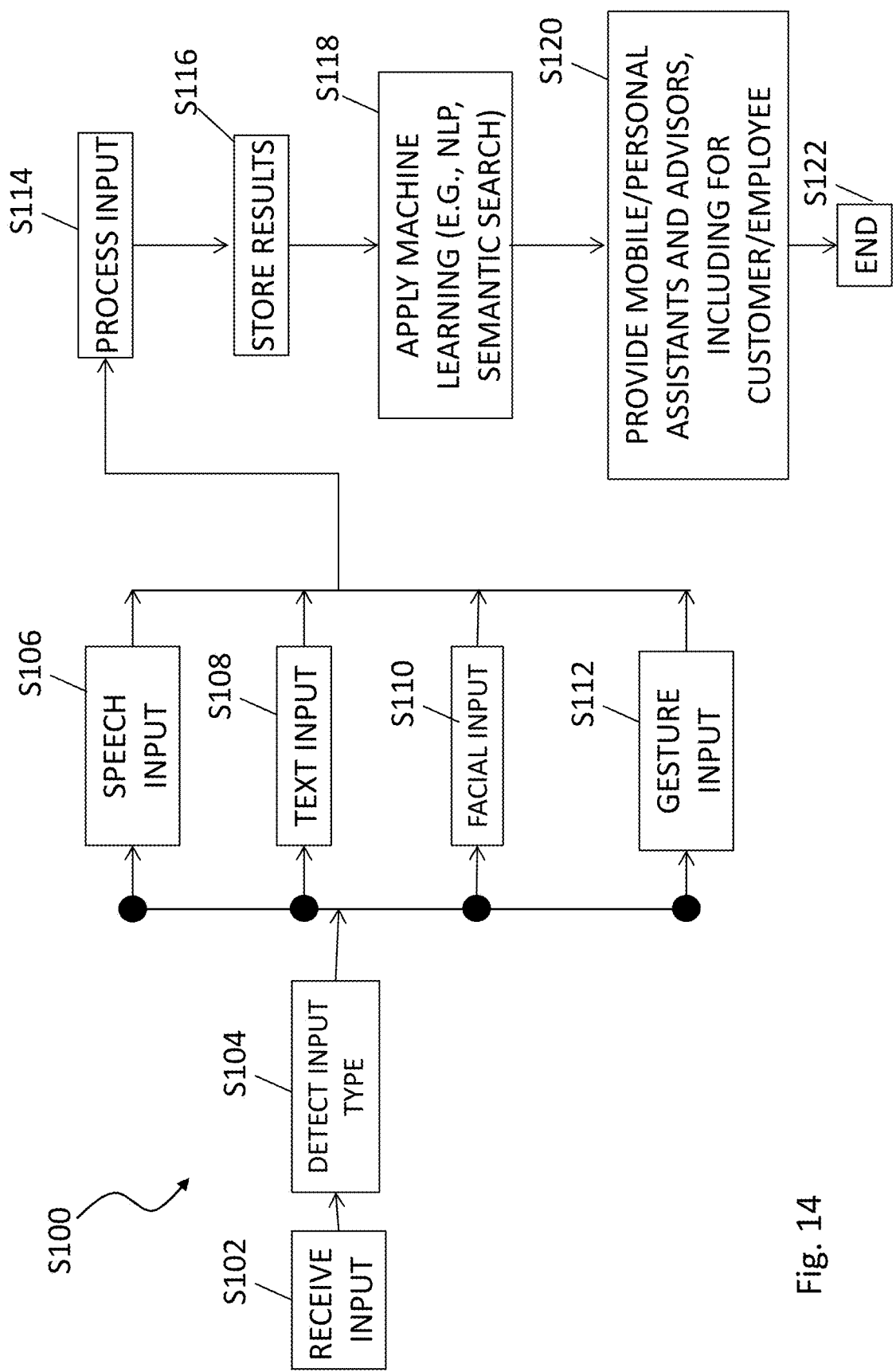
FIG. 14 is an example flow diagram illustrating example steps associated with an implementation of the present application.

Turning now to FIG. 14, a flow diagram is described showing a routine S100 that illustrates a broad aspect of a method for providing one or more artificial intelligent agents, in accordance with at least one implementation disclosed herein. It should be appreciated that several of the logical operations described herein are implemented (1) as a sequence of computer implemented acts or program modules running on computing device 102/104 and/or (2) as interconnected machine logic circuits or circuit modules within computing device 102/104. The implementation is a matter of choice, dependent for example on the requirements of the device (e.g., size, mobility, energy, consumption, performance, etc.). Accordingly, the logical operations described herein are referred to variously as operations, steps, structural devices, acts, or modules. As referenced above, various ones of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

At step S102, the process starts, and input is received. The input type is detected, for example at S104. For example, the input can be one or more of speech input S106, text input S108, facial input S110, and gesture input S112. At step S114, the input is processed. For example, speech processing can be performed using artificial intelligence, and signals in the speech can be detected to interpret at least one spoken word. Where the input is facial input, the facial input is processed using artificial intelligence to interpret at least one expression. Where the input is gesture input, the gesture input is processed using artificial intelligence to interpret at least one message or command. Where the input is textual input, the textual input is processed using artificial intelligence to interpret at least one written word. The processed information can be stored in one or more databases (step S116).

Continuing with the steps shown in FIG. 14, at step S118, machine learning is applied, such as natural language processing and semantic searching, and an intelligent virtual assistant is provided at step S120. The assistant can be formatted as a mobile assistant, a virtual personal assistant, a virtual advisor, including for customers, employees or other suitable users. At step S122, the process ends.

Thus, the present application provides significant flexibility and creativity in connection with creating and viewing coordinated presentations. Although many of the examples shown and described herein regard distribution of coordinated presentations to a plurality of users, the invention is not so limited. Conversational technologies, such as directed to speech processing, natural language processing systems comprising machine learning and semantic searching are applied in connection with providing various applications, such as mobile and personal assistants, personal advisors, virtual agents, customer assistants, and employee assistants.

Although many of the examples shown and described herein regard distribution of coordinated presentations to a plurality of users, the invention is not so limited. Illustrated embodiments of the present invention have been shown and described, it should be understood that various changes, substitutions, and alterations can be made by one of ordinary skill in the art without departing from the scope of the present application.

What is claimed is:

1. A computer-implemented system for providing intelligent virtual assistance to at least one of a plurality of computing devices during a networked communication session, the system comprising:
    non-transitory processor readable media;
    at least one processor operatively coupled to the non-transitory processor readable media, wherein the non-transitory processor readable media have instructions that, when executed by the at least one processor, causes the at least one processor to perform the following steps:
    determine that each of the plurality of computing devices is associated with an individual who is scheduled to attend the networked communication session;
    receive input, over the networked communication session from at least one of the plurality of computing device,
    process, as a function of information provided in or with the input, at least one of speech input, facial input, gesture input and textual input;
        where the input includes speech input, process signals in the speech input using artificial intelligence to interpret at least one spoken word;
        where the input includes facial input, process the facial input using artificial intelligence to interpret at least one expression;
        where the input includes gesture input, process the gesture input using artificial intelligence to interpret at least one message or command;
        where the input includes textual input, process the textual input using artificial intelligence to interpret at least one written word;
    identify, from the step of processing, that the input includes a question;
    accessing information associated with the question; and
    provide the intelligent virtual assistance as a function of the information for at least one of the plurality of computing devices,
    wherein the intelligent virtual assistance includes providing a response to the question that includes at least some of the information during the networked communication session.

2. The system of claim 1, wherein the non-transitory processor readable media have further instructions that, when executed by the at least one processor, causes the at least one processor to:
    perform natural language processing, including at least one of speech recognition, natural language understanding, and natural language generation, wherein the question is included in speech input.

3. The system of claim 1, wherein the intelligent virtual assistance is provided during generation of an interactive coordinated presentation, and/or prior to or during the networked communication session.

4. The system of claim 1, wherein the non-transitory processor readable media have further instructions that, when executed by the at least one processor, causes the at least one processor to:
    configure at least one of the computing device(s) to present the customizable interactive audio/video content on a display via an Internet media extender.

5. The system of claim 1, wherein the intelligent virtual assistance includes at least one of inserting images, answering queries, writing, drawing, define an action item, and define an agenda item.

6. The system of claim 1, wherein the non-transitory processor readable media have further instructions that, when executed by the at least one processor, causes the at least one processor to:
    store at least some of the processed input; and use at least some of the stored processed input for additional intelligent virtual assistance.

7. The system of claim 1, wherein the facial input includes facial expressions and is received via a camera configured with one of the plurality of computing devices, further wherein the speech input is received via a microphone configured with one of the plurality of computing devices.

8. The system of claim 1, wherein the non-transitory processor readable media have further instructions that, when executed by the at least one processor, causes the at least one processor to:
    proactively provide, by the intelligent virtual assistant, suggestions to a user of at least one of the plurality computing devices.

9. A computer-implemented method for providing an intelligent virtual assistant for generating and using respectively customizable interactive audio/video content to each of a plurality of computing devices during a networked communication session, the system comprising:
    determining, by at least one processor configured by instructions on non-transitory processor readable media, that each of the plurality of computing devices is associated with an individual who is scheduled to attend the networked communication session; receiving, by the at least one processor, input, over the networked communication session from at least one of the plurality of computing devices configured to provide the input, processing, by the at least one processor, as a function of information provided in or with the input at least one of speech input, facial input, gesture input and textual input;
        where the input includes speech input, processing, by the at least one processor, signals in the speech input using artificial intelligence to interpret at least one spoken word;
        where the input includes facial input, processing, by the at least one processor, the facial input using artificial intelligence to interpret at least one expression;

where the input includes gesture input, processing, by the at least one processor, the gesture input using artificial intelligence to interpret at least one message or command;

where the input includes textual input, processing, by the at least one processor, the textual input using artificial intelligence to interpret at least one written word;

identifying, by the at least one processor from the step of processing, that the input includes a question;

accessing, by the at least one processor, information associated with the question; and providing, by the at least one processor, the intelligent virtual assistant as a function of the information for at least one of the plurality of computing devices, including to provide a response to the question that includes at least some of the information during the networked session.

10. The method of claim 9, further comprising:
performing, by the at least one processor, natural language processing, including at least one of speech recognition, natural language understanding, and natural language generation; and
performing, by the at least one processor, semantic search processing as a function of at least some results of the natural language processing.

11. The method of claim 9, wherein the gesture based input includes hand gestures.

12. The method of claim 9, further comprising:
performing, by the at least one processor, optical character recognition to derive at least some of the textual input.

13. The method of claim 9, wherein the intelligent virtual assistant is provided during generation of an interactive coordinated presentation, and/or prior to or during an on-line interactive video conference.

14. The method of claim 9, further comprising:
configuring, by the at least one processor, at least one of the computing device(s) to present the customizable interactive audio/video content on a display via an Internet media extender.

15. The method of claim 9, wherein the intelligent virtual assistant includes at least one of inserting images, answering queries, writing, drawing, define an action item, and define an agenda item.

16. The method of claim 9, further comprising:
storing, by the at least one processor, at least some of the processed input; and using, by the at least one processor, at least some of the stored processed input for additional intelligent virtual assistant.

17. The method of claim 9, wherein the facial input includes facial expressions and is received via a camera configured with one of the plurality of computing devices.

18. The method of claim 9, further comprising:
proactively providing, by the intelligent virtual assistant, suggestions to a user of at least one of the plurality computing devices.

19. The system of claim 1, wherein the non-transitory processor readable media have further instructions that, when executed by the at least one processor, causes the at least one processor to:
monitor, during the participants sentiments during the networked communication session;
and provide, after the networked communication session, information regarding the sentiments.

20. The system of claim 1, wherein the non-transitory processor readable media have further instructions that, when executed by the at least one processor, causes the at least one processor to: provide, after the networked communication session, a summary of content received during the networked communication session.

\* \* \* \* \*